No. 666,764. Patented Jan. 29, 1901.
N. O. LINDSTROM & A. COWPERTHWAIT.
ELECTRIC CIRCUIT CONTROLLER.
(Application filed July 6, 1900.)
(No Model.)
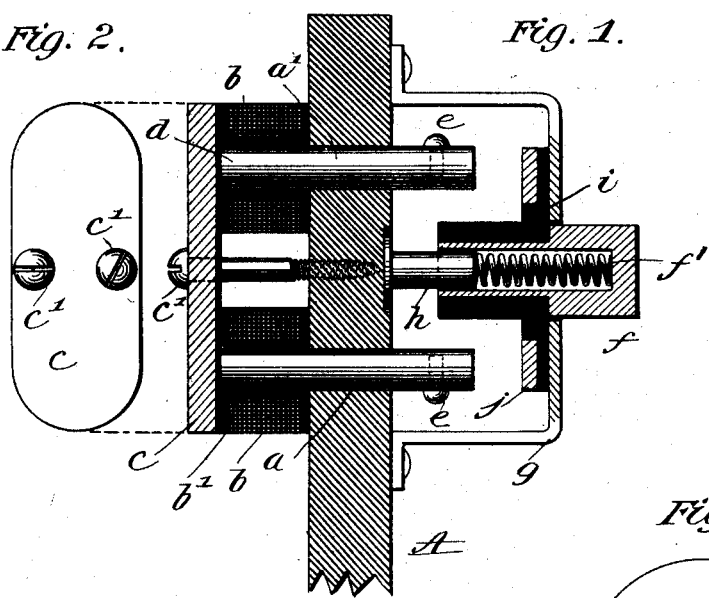
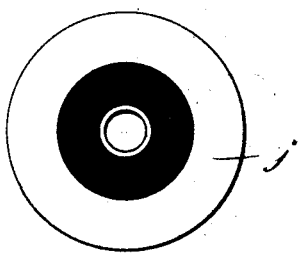
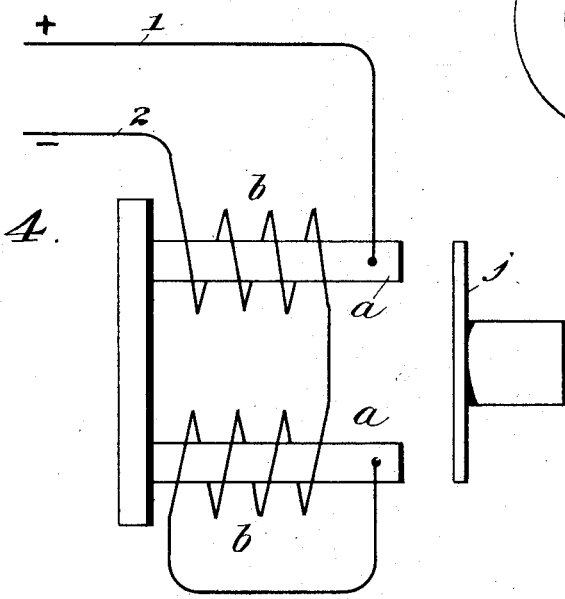
WITNESSES:
INVENTORS:
Nils O. Lindstrom
Allan Cowperthwait
BY
Rosenbaum
ATTORNEY

United States Patent Office.

NILS O. LINDSTROM AND ALLAN COWPERTHWAIT, OF NEW YORK, N. Y., ASSIGNORS TO ALONZO B. SEE AND WALTER L. TYLER, OF SAME PLACE.

ELECTRIC-CIRCUIT CONTROLLER.

SPECIFICATION forming part of Letters Patent No. 666,764, dated January 29, 1901.

Application filed July 6, 1900. Serial No. 22,683. (No model.)

*To all whom it may concern:*

Be it known that we, NILS O. LINDSTROM and ALLAN COWPERTHWAIT, citizens of the United States, residing at the city of New York, in the borough of Brooklyn and State of New York, have invented certain new and useful Improvements in Electric-Circuit Controllers, of which the following is a full, clear, and exact description.

This invention relates to electric-circuit controllers, the object being to provide a device in the nature of a push-button which when the circuit has been closed thereby will automatically remain closed, notwithstanding that the finger be removed from the button, and will continue in such condition until the circuit has been broken at another point, whereupon the push-button will resume its normal position.

In carrying out the invention we provide a push-button, the movable member of which carries a bridging-piece, which to close the circuit makes contact with the two poles of a horseshoe-electromagnet, the said poles being electrically insulated from each other, but still constituting portions of the magnetic circuit of the magnet of which they form a part. The said bridging-piece carried by the push-button serves as the armature of the said electromagnet, and the circuit which it completes by making contact with the poles of said magnet includes the coils of the magnet, the consequence of which is that when the bridging-piece has been carried into contact with the poles of the magnet it is held in such relation by the attraction of the vitalized magnet. A spring is introduced in the push-button to return it to its normal position when the circuit of the magnet is again opened.

The invention will be described more in detail with reference to the accompanying drawings, in which—

Figure 1 is a sectional view of our improved device. Fig. 2 is a rear elevation of the magnet, showing merely the back yoke. Fig. 3 is a face view of the push-button and bridging-armature, and Fig. 4 is a diagram of the circuit.

A is a plate, of insulating material, forming the base to which the other parts are attached. This plate is perforated at two points to receive the two legs or poles $a$ and $a'$ of a horseshoe-electromagnet. These poles extend beyond both faces of the plate and at the rear of the plate. Each of them is surrounded by electric coils $b$, wound upon spools $b'$, of insulating material. The back yoke of the magnet is formed by the soft-iron plate $c$, which is held against the rear of the two spools by the screws $c'$, which enter the base-plate A; but said back yoke is electrically insulated from the polar extensions $a$ and $a'$ by a sheet of mica or other insulating material $d$, such sheet of material, however, being only of such thickness as to afford the stated insulation without interposing substantial resistance to the magnetic lines of force. The opposite ends of the pole-pieces $a$ and $a'$ project from the front face of the plate A and are each provided with a binding-screw $e$ for the attachment of circuit-terminals.

$f$ indicates a push-button, which is guided in its reciprocating movements by a yoke-shaped frame $g$ and a center post $h$, secured to the base A and entering an axial opening in the inner end of the button. A spring $f'$ is located in said opening between the button and the head of the post to hold the button in its normal or outer position. Surrounding the button and carried by it is a ring $i$ of insulating material carrying another ring $j$ of soft iron, the diameter of which is such as to bridge the two pole-pieces $a$ and $a'$. The electric circuits are indicated in Fig. 4, wherein it will be seen that two coils $b\ b$ are connected in series with each other in a circuit 1 2, having two terminals respectively connected with the polar extensions $a$ and $a'$.

The operation of the circuit-controller is as follows: When the button is pushed inward until the iron ring $j$ comes in contact with both of the pole-pieces $a$ and $a'$, the circuit of the electromagnet is completed, and said magnet being thereby vitalized attracts and holds the ring $j$ in contact with its poles. If the finger is then removed from the button, the button will retain its position against the poles and the circuit will be maintained complete until it is broken at some other location. When the circuit is finally broken elsewhere, the magnet, becoming deënergized, releases the ring-armature, and the button is forced out to its normal position (shown in Fig. 1) by the spring $f'$.

Devices of this character are useful in various places where automatic machinery is operated. For instance, in the operation of elevators, where it is desired to render the control as simple as possible, such a push-button can be put into the car and operated to start the hoisting machinery and retain it in operation until a car reaches a certain landing, whereupon a second automatic circuit-controller will open the circuit to stop the car and return the push-button to its normal position.

Having described our invention, we claim—

1. In an electric-circuit controller, the combination of a horseshoe-electromagnet the poles of which are electrically insulated from each other and form respective terminals of the circuit including its coils, and an armature adapted to be manually thrown into contact with said poles, substantially as described.

2. In an electric-circuit controller, the combination of a horseshoe-electromagnet, the legs or poles of which are electrically insulated from the back yoke, an electric circuit including the coils of said electromagnet and terminating respectively at the pole-pieces thereof, and an armature adapted to bridge said pole-pieces.

3. In an electric-circuit controller, a horseshoe-electromagnet, whose pole-pieces constitute circuit-terminals and are electrically insulated from its back yoke, a push-button carrying an armature for said magnet and means for holding the armature out of contact with the poles of the magnet, while the magnet is deënergized.

4. In an electric-circuit controller, the combination of a base-plate two pole-pieces extending therethrough and projecting beyond each face, electric coils surrounding one end of each pole-piece, a soft-iron plate clamped against said ends with a sheet of insulating material interposed between said ends and the plate, an electric circuit whose terminals are connected respectively with said pole-pieces, and an armature adapted to bridge the pole-pieces, substantially as described.

In witness whereof we subscribe our signatures in presence of two witnesses.

NILS O. LINDSTROM.
ALLAN COWPERTHWAIT.

Witnesses:
WM. A. ROSENBAUM,
JAMES A. DONNELLY.